United States Patent
Walls et al.

(10) Patent No.: US 9,392,045 B2
(45) Date of Patent: Jul. 12, 2016

(54) REMOTE GRAPHICS CORRESPONDING TO REGION

(75) Inventors: Jeffrey Joel Walls, Fort Collins, CO (US); Derek Lukasik, Fort Collins, CO (US); Karen Ellen Thayer, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 733 days.

(21) Appl. No.: 13/362,196

(22) Filed: Jan. 31, 2012

(65) Prior Publication Data
US 2013/0194270 A1     Aug. 1, 2013

(51) Int. Cl.
*G06T 1/20*     (2006.01)
*H04L 29/08*    (2006.01)

(52) U.S. Cl.
CPC ............. *H04L 67/025* (2013.01); *G06T 1/20* (2013.01)

(58) Field of Classification Search
USPC ........................................................ 345/428
See application file for complete search history.

(56) References Cited

U.S. PATENT DOCUMENTS

| | | | |
|---|---|---|---|
| 7,895,521 B2 | 2/2011 | Bhogal et al. | |
| 2007/0283239 A1* | 12/2007 | Morris | 715/511 |
| 2009/0125838 A1* | 5/2009 | Bhogal et al. | 715/788 |
| 2010/0269039 A1* | 10/2010 | Pahlavan et al. | 715/702 |
| 2011/0164058 A1* | 7/2011 | Lemay | 345/651 |
| 2011/0265009 A1* | 10/2011 | Eby et al. | 715/740 |
| 2013/0314313 A1* | 11/2013 | Ericson et al. | 345/156 |
| 2015/0200998 A1* | 7/2015 | Gu et al. | H04L 67/025 |

OTHER PUBLICATIONS

Symantec PcAnywhere User's Guide. Cupertino: Symantec Corporation, 2006. PDF.*

* cited by examiner

*Primary Examiner* — Mark Zimmerman
*Assistant Examiner* — Vu Nguyen
(74) *Attorney, Agent, or Firm* — HP Inc. Patent Department (57) ABSTRACT

A computing device to receive remote graphics based on a size of a display component from a second computing device, display a user interface to include the remote graphics, detect a user repositioning a region of the user interface, transmit information of the repositioned region to the second computing device and receive remote graphics corresponding to the repositioned region for display on the display component.

20 Claims, 6 Drawing Sheets

REMOTE GRAPHICS CORRESPONDING TO REGION

BACKGROUND

A computing device can communicate with another computing device to receive a view of content from the other computing device. The content transferred from the other computing device can include can include a video stream or a remote desktop of the other computing device. When transmitting the content, the other computing device can transmit all of the content to the computing device. This may lead to wasted resources or wasted bandwidth for both the computing device and the other computing device.

BRIEF DESCRIPTION OF THE DRAWINGS

Various features and advantages of the disclosed embodiments will be apparent from the detailed description which follows, taken in conjunction with the accompanying drawings, which together illustrate, by way of example, features of the disclosed embodiments.

DETAILED DESCRIPTION

A computing device, such as laptop and/or a smart phone, can receive remote graphics from a second computing device. For the purposes of this application, the remote graphics can include visual content from the second computing device, such as a file, a media object, and/or a remote desktop of the second computing device. When transmitting the remote graphics to the computing device, the second computing device can base a resolution of the remote graphics on an identified size of a display component of the computing device. In one embodiment, the remote graphics include visual content of the second computing device scaled to the resolution of the display component.

In another embodiment, the remote graphics include a selected portion of the visual content matching the size or resolution of the display component. Other areas or portions of the visual content outside the selected portion are not transmitted by the second computing device. As a result, the computing device and the second computing device can save power and resources by not encoding, compressing, or preparing additional portions of the visual content outside the selected portion. Additionally, bandwidth can be saved by both the computing device and the second computing device by not communicating the non-selected portions.

The computing device can receive the remote graphics from the second computing device and render a region of a user interface to include the remote graphics. In one embodiment, the region can envelope or cover all of the user interface. In another embodiment, the region can include a portion of the user interface. A sensor of the computing device, such as an image capture component, a microphone, and/or a touch sensor, can detect for a user repositioning the region by panning the user interface or zooming in/out of the user interface.

The computing device can transmit information of the repositioned region to the second computing device. The second computing device can then identify which portions of the visual content on the second computing device correspond to the repositioned region. The second computing device can then update the remote graphics to include visual content corresponding to the repositioned region and transfer the remote graphics for the computing device to display. Other areas or portions of the visual content outside the region not transmitted to the computing device.

Figure 1:
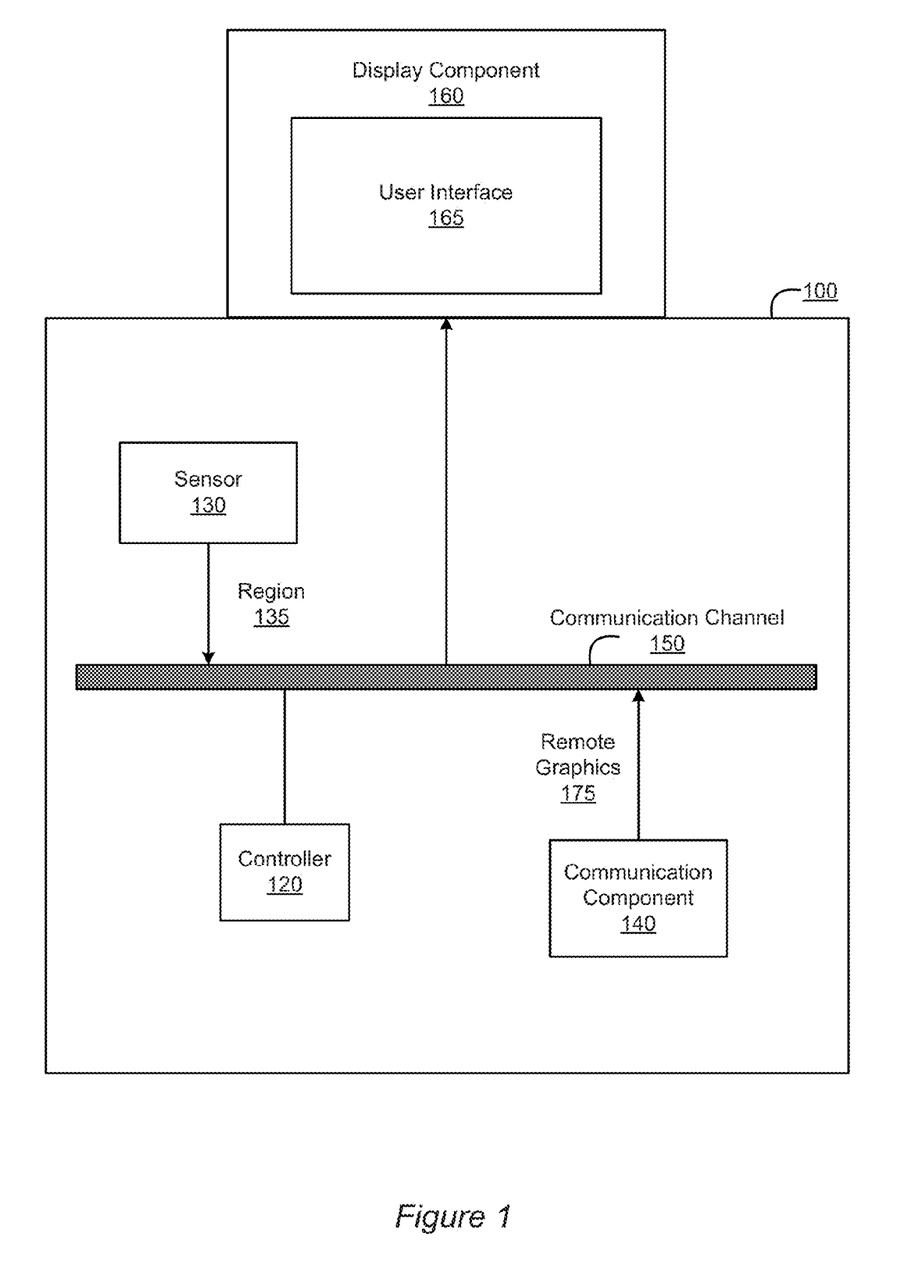
FIG. 1 illustrates a computing device to display remote graphics according to an example.

FIG. 1 illustrates a computing device 100 to display remote graphics 175 according to an example. The computing device 100 can be a cellular device, a PDA (Personal Digital Assistant), and/or an E (Electronic)-Reader. In another embodiment, the computing device 100 can be a laptop, a notebook, a tablet, a netbook, an all-in-one system, a desktop, a workstation, a server and/or any additional computing device to display remote graphics 175.

As illustrated in FIG. 1, the computing device 100 includes a controller 120, a sensor 130, a communication component 140, a display component 160 and a communication channel 150 for the computing device 100 and/or one or more components of the computing device 100 to communicate with one another. In one embodiment, the computing device 100 additionally includes a graphics application stored on a non-transitory computer readable memory coupled to the computing device 100. The graphics application is an application which can be utilized in conjunction with the controller 120 to manage remote graphics 175 for display on a display component 160.

For the purposes of this application, the remote graphics 175 include visual content from a second computing device, such as a document, a media object, and/or a remote desktop of the second computing device. The second computing device can be a desktop, a workstation, a server, a laptop, a notebook, a tablet, a netbook, and/or any additional computing device to transmit remote graphics 175 to include visual content or a portion of the visual content. The second computing device can initially transmit the remote graphics 175 based on a size of a display component 160 of the computing device 100. The size of the display component 160 can correspond to a resolution of the display component 160.

The second computing device can detect or receive the size of the display component 160 from a communication component 140 of the computing device 100. In one embodiment, the second computing device can scale the visual content from the second computing device to a size of the display component 160. The scaled visual content can be transferred as remote graphics 175 to the computing device 100. In another embodiment, the second computing device can select a portion of the visual content matching the size of the display component 160 to transmit as remote graphics 175. The portion of the visual content can be predefined to be a center portion, a corner portion, and/or any additional portion of the visual content.

A communication component 140 of the computing device 100 such as a network interface component, a wireless radio device, a Bluetooth device, and/or an infrared device, can receive the remote graphics 175 from the second computing device. In response to receiving the remote graphics 175, the controller 120 and/or the graphics application can display the remote graphics 175 as a region 135 of a user interface 165 of the computing device 100. For the purposes of this application, the user interface 165 corresponds to the visual content of the second computing device. Additionally, a size of the user interface 165 corresponds to a size of the visual content. For example, if a size of the visual content includes a resolution of 1600×1200 pixels, the size of the user interface 165 is also 1600×1200 pixels.

The region 135 of the user interface 165 is displayed by a display component 160, such as a LCD (liquid crystal display), a LED (light emitting diode) display, a CRT (cathode ray tube) display. Depending on the size of the visual content, the size of the region 135 can encompass all or a portion of the user interface 165. As the remote graphics 175 are displayed by the display component 160, a sensor 130 of the computing device 100 can detect a user of the computing device 100 reposition the region 135 of the user interface 165. The sensor 130 can be a hardware component of the computing device 100, such as an image capture component, a touch sensor, a microphone, a proximity sensor, and/or touch screen to detect the user reposition the region 135 of the user interface 165 with a touch gesture, a visual gesture, and/or a voice gesture. The touch, visual, and/or voice gesture can be made with a hand, finger, voice, and/or accessory of the user.

The sensor 130 can detect for a zooming command, a panning command, and/or any additional navigation command from the user when detecting the region 135 of the user interface 165 repositioning. In one embodiment, the controller 120 and/or the graphics application can identify coordinates of the user interface 165 corresponding to the region 135 before it has been repositioned. If the region 135 is repositioned, the controller 120 and/or the graphics application can identify which coordinates of the user interface 165 correspond to repositioned region 135 and send information of the repositioned region 135 to second computing device with the communication component 140. In one embodiment, the information of the region 135 includes the coordinates of the reposition region 135 on the user interface 165. In another embodiment, the information can include how many pixels left, right, up, and/or down the region 135 has repositioned.

In response to receiving the information of the repositioned region 135, the second computing device can identify which area or location of the visual content corresponds to the repositioned region 135. In one embodiment, the second computing device can compare the coordinates of the repositioned region 135 to coordinates of the visual content. The second computing device can then transmit remote graphics 175 corresponding to the repositioned region 135 to the computing device 100. The controller 120 and/or the graphics application can then update the user interface 165 to include the remote graphics 175 on the display component 160.

Figure 2A:
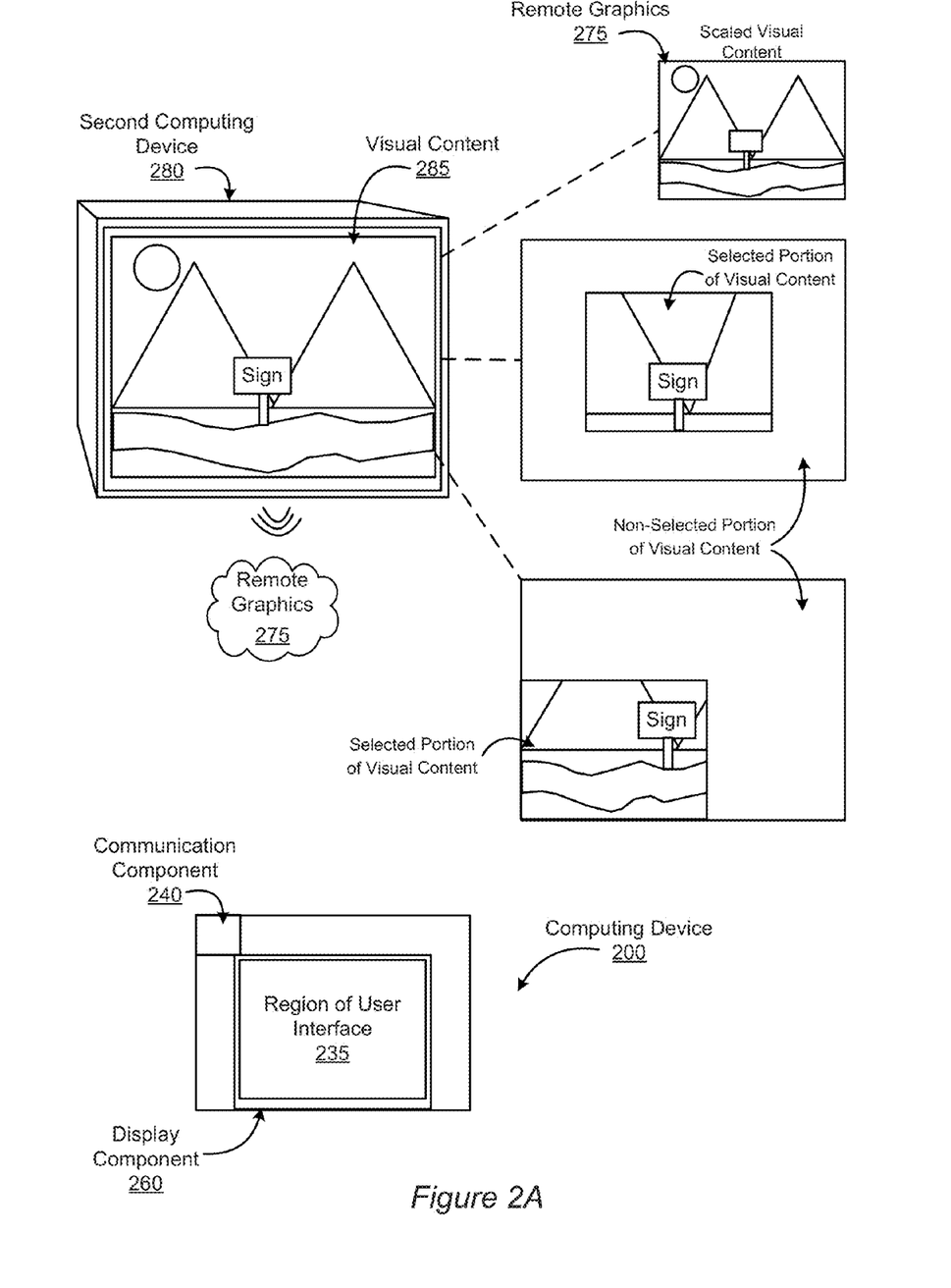
FIGS. 2A, 2B, and 2C illustrate a computing device receiving remote graphics from a second computing device according to examples.
Figure 2B:
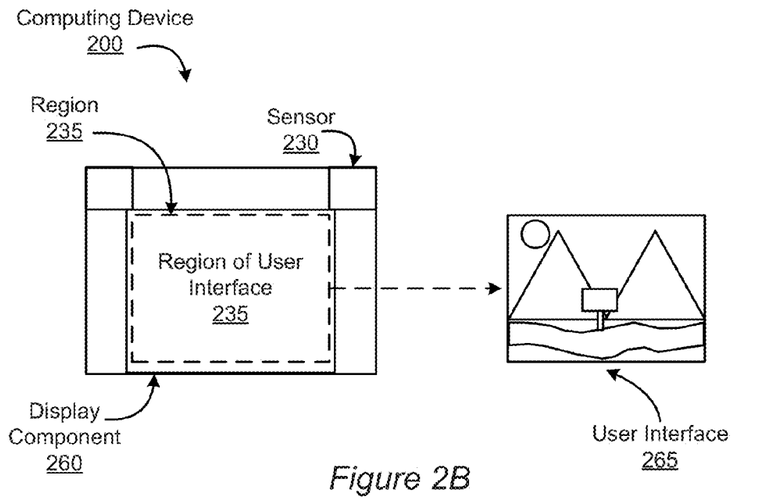
Figure 2C:
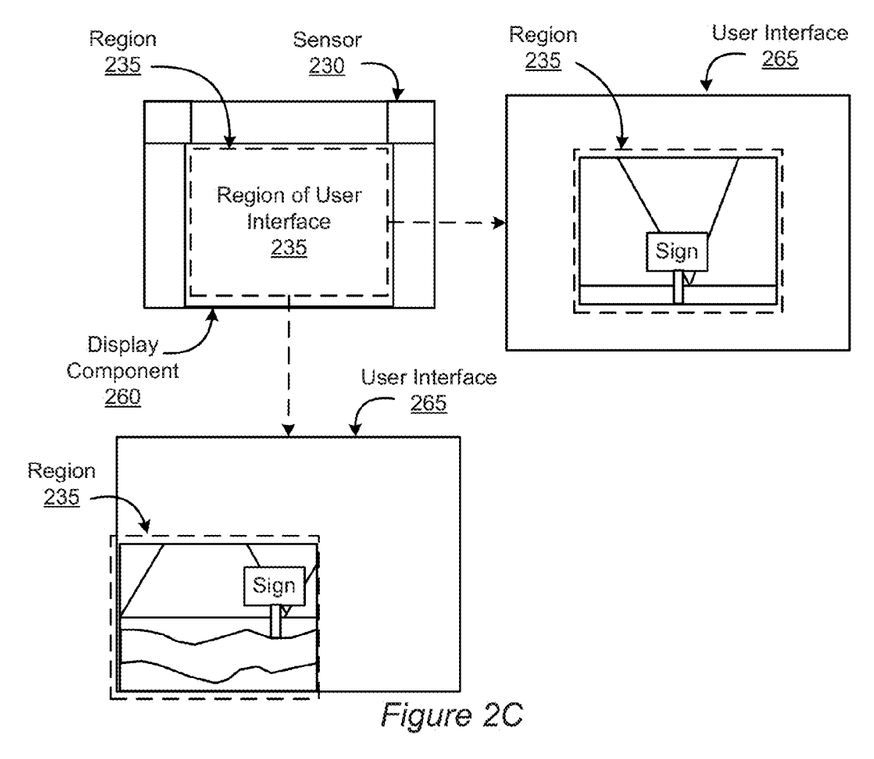

FIGS. 2A, 2B, and 2C illustrate a computing device 200 receiving remote graphics 275 from a second computing device 280 according to examples. The second computing device 280 can be a server, a service provider, a workstation, a desktop, a portable computing device, and/or any additional computing device. In one embodiment, not illustrated, the second computing device 280 can include a second communication component to receive a size of the display component 260 from the computing device 200. Similar to the communication component 240 of the computing device 200, the second computing device 280 can include a network interface component, a wireless radio device, a Bluetooth device, and/or an infrared device.

The second computing device 280 can receive the size of the display component 260 by polling the computing device 200 for the size, prompting the computing device 200 for the size, and/or in response to a user of the computing device 200 sending the size to the second computing device 200. The size of the display component 260 of the computing device 200 can correspond to a resolution of the display component 260 and/or an X,Y offset of the display component 260. The X,Y offset can correspond to a horizontal and vertical distance between pixels included in the display component 260. In response to identifying the size of the display component 260, the second computing device 280 can transmit remote graphics 275 of visual content 285 based on the size of the display component 260. The visual content 285 can include a file, media object, and/or remote desktop of the second computing device 280. As shown in the present embodiment, the visual content 285 can be an image from the second computing device 280.

In one embodiment, the size of the visual content 285 of the second computing device 280 includes a resolution of 1600×1200 and is larger than the resolution of the display component 260 of 1024×768. The second computing device 280 can scale down the visual content 285 to the resolution of the display component 260 and transfer the scaled visual content 285 as remote graphics 275 to the computing device 200. The second computing device 280 can transmit the remote graphics 275 to the computing device 200 as a video stream. In another embodiment, the remote graphics 275 can be transferred as a file and/or as one or more data packets.

In another embodiment, instead of scaling the visual content 285, the second computing device 280 can select a portion of the visual content 285, such as a center portion and/or a corner portion, to transfer as the remote graphics 275. For example, if a size of the display component 260 includes a resolution of 1024×768, the second computing device 280 can select a portion of the visual content with a resolution of 1024×768. When determining which portion of the visual content 285 to transfer as the remote graphics 275, the second computing device 280 can randomly select a portion, prompt the computing device 200 to select a portion, and/or select a predefined portion of the visual content 285 to transfer as the remote graphics 275. The second computing device 280 can transfer the remote graphics 275 with the portion to the computing device 200. The second computing device 280 does not transfer non-selected portions of the visual content 285 to the computing device 200. As a result, resources and bandwidth are saved by the computing device 200 and the second computing device 280.

A communication component 240 of the computing device 200, such as a network interface component, a wireless radio device, a Bluetooth device, and/or an infrared device, of the computing device 200 can receive the remote graphics 275. A controller and/or a graphics application of the computing device 200 can display a region 235 of a user interface 265 on a display component 260 to include the remote graphics 275. The display component 260 is a hardware component of the computing device 200 to display the region 235 with the remote graphics 275. In one embodiment, the display component 260 can be a LCD display, a LED display, a CRT display, a plasma display, a projector, and/or any additional output component to display the remote graphics 275.

As shown in FIG. 2B, the region 235 of the user interface 265 can be rendered for display on the display component 260. As noted above, the user interface 265 corresponds to the visual content 285 of the second computing device 280 and a size of the user interface 265 corresponds to a size of the visual content. For example, if a size of the visual content 285 includes a resolution of 1600×1200, the size of the user interface 265 also includes a resolution of 1600×1200.

As shown in FIG. 2B, the region 235 of the user interface 265 corresponds to the viewable area or a location of the user interface 265 which is displayed by the display component 260. A size of the region 235 corresponds to the size of the display component 260. As shown in the present embodiment, if the visual content 285 is scaled by the second computing device 280 to the resolution of the display component 260, a size of the user interface 265 matches the size of the display component 260. As a result, the region 235 of the user interface 265 envelopes all of the user interface 265 and all of the visual content from the second computing device 280 is visible on the display component 260.

In another embodiment, as shown in FIG. 2C, the visual content 285 from the second computing device 280 is not scaled to the resolution of the display component 265 and the size of the user interface 265 is larger than the display component 260. As a result, not all of the visual content 285 from the second computing device 200 is included in the region 235 of the user interface 265 for display. Instead the region 235 of the user interface 265 displays the remote graphics 275 with the selected portion of the visual content 285. As shown in FIG. 2C, other areas of the user interface 265 outside the region 235 correspond to the non-selected portions of the visual content 285 from the second computing device 280 and are currently displayed on the display component 260.

As noted above, the computing device 200 can include a sensor 230 to detect the user repositioning the region 235 of the user interface 265. The sensor 230 is a hardware component to detect for a visual gesture, a touch gesture, and/or an audio gesture to navigate the user interface 265. In one embodiment, the sensor 230 can be an image capture component, a microphone, a proximity sensor, a touch sensor, a touch panel, and/or any additional component to detect the use reposition the region 235.

The sensor 230 can detect the visual gesture, the touch gesture, and/or the audio gesture to identify a navigation command associated with the gesture. The touch, visual, and/or voice gesture can be made with a hand, finger, voice, and/or accessory of the user. In one embodiment, if the user would like to view the top center of the user interface 265, the navigation command can be a command to pan or move up. As a result, the region 235 can shift up and the remote graphics 275 can be updated to include the upper portion of the visual content from the second computing device. In another embodiment, if the user would like to magnify an item on the remote graphics 275, the user can zoom into the region 235 and the remote graphics 275 can be updated to include the item of the visual content from the second computing device 280. Updating the remote graphics 275 can include scaling a resolution of the item up to match the display component 260.

Figure 3:
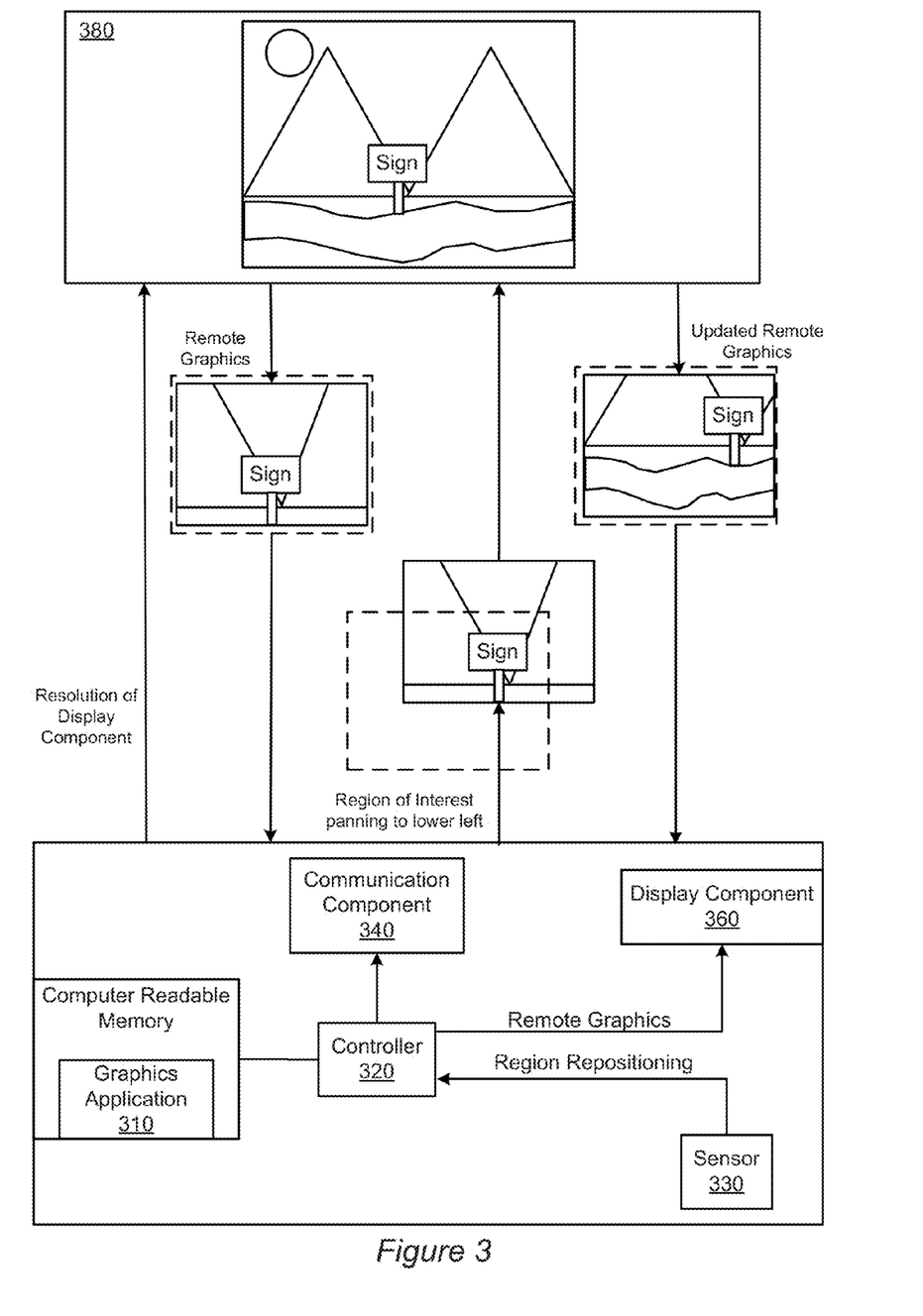
FIG. 3 illustrates a block diagram computing device transmitting information to a second computing device and receiving remote graphics corresponding to a repositioned region of a user interface according to an example.

FIG. 3 illustrates a block diagram of a computing device transmitting information to a second computing device and receiving remote graphics corresponding to a region of a user interface according to an example. As noted above, the computing device can include a graphics application 310 with can be utilized independently and/or in conjunction with the controller 320 to manage remote graphics for the computing device. In one embodiment, the graphics application 310 can be a firmware embedded onto one or more components of the computing device. In another embodiment, the graphics application 310 can be an application accessible from a non-volatile computer readable memory of the computing device. The computer readable memory is a tangible apparatus that contains, stores, communicates, or transports the application for use by or in connection with the device. In one embodiment, the computer readable memory is a hard drive, a compact disc, a flash disk, a network drive or any other form of tangible apparatus coupled to the computing device.

The controller 320 and/or the graphics application 310 initially identify a size of the display component 360 by identifying a resolution and/or X, Y offset of the display component 360. The controller 320 and/or the graphics application 310 can then transmit the size of the display component 360 to the second computing device 380 with the communication component 340. Based on the size of the display component 360, the second computing device 380 can transmit all or a portion of visual content as remote graphics. As shown in the present embodiment, a portion of the visual content, the center portion, is transferred as the remote graphics to the computing device. A resolution of the portion included in the remote graphics matches the resolution of the display component.

The controller 320 and/or the graphics application 310 can render the remote graphics on a region of the user interface with the display component 360. As noted above, the user interface corresponds to the visual content and the region of the user interface corresponds to the remote graphics displayed by the display component 360. Additionally, a size of the user interface matches a size of the visual content from the second computing device and a size of the region matches a size of the display component and a size of the remote graphics. In one embodiment, the controller 320 and/or the graphics application 310 track a location of the region on the user interface with a coordinate map. The coordinate map can include coordinates for each location or pixel on the user interface to identify where on the user interface the region is located.

As the remote graphics are rendered, the sensor 330 detects for a user repositioning the region of the user interface. As shown in the present embodiment, the sensor 330 has detected the user reposition the region with a panning command to the lower left of the user interface. The controller 320 and/or the graphics application 310 can identify which coordinates of the user interface correspond to the repositioned region and proceed to send the coordinates to the second computing device 380. In response to receiving the coordinates, the second computing device 380 determines that the user would like to view another portion or area of the visual content and identifies which portion of the visual content the user is interested in. The second computing device can then send the identified portion of the visual content as remote graphics to the computing device. The controller 320 and/or the graphics application 310 can then include the updated remote graphics in the region of the user interface on the display component 360.

Figure 4:
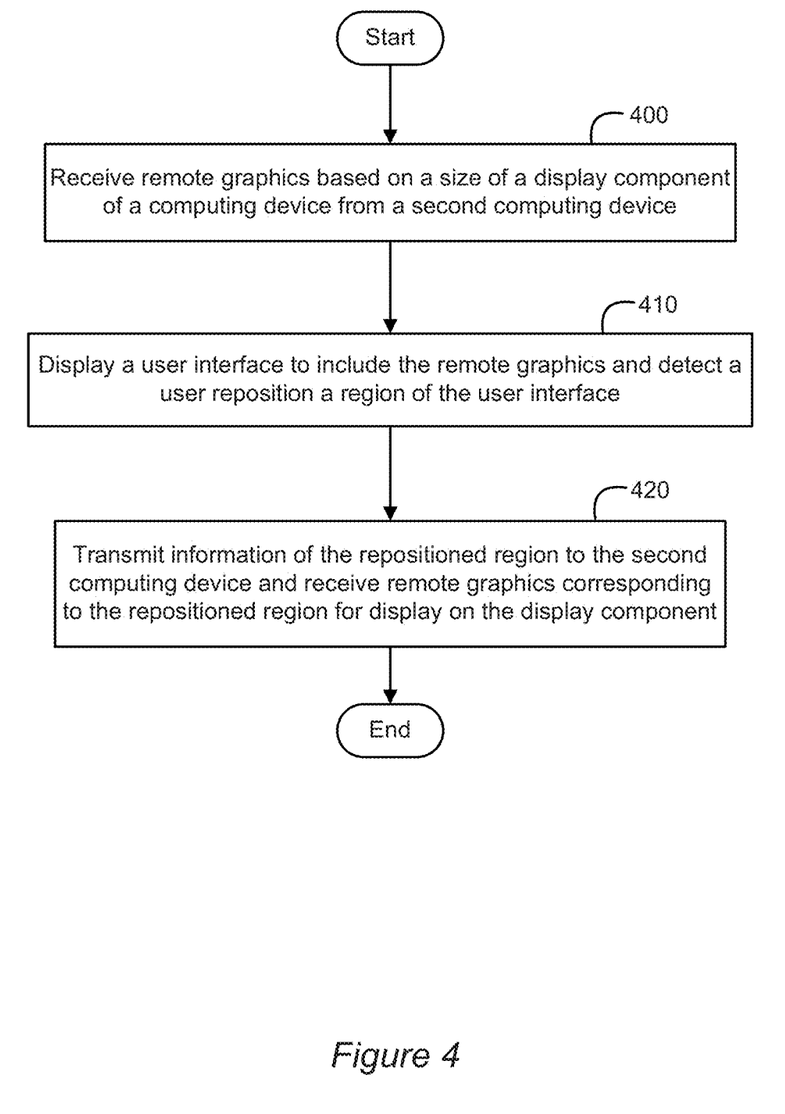
FIG. 4 is a flow chart illustrating a method for managing remote graphics according to an example.

FIG. 4 is a flow chart illustrating a method for managing remote graphics according to an example. As noted above, a graphics application can be utilized independent and/or in conjunction with the controller to manage remote graphics from a second computing device. The second computing device can initially detect or receive a size of a display component of a computing device. The size can include a resolution and/or a X, Y offset of the display component. Based on the size of the display component, the second computing device can transmit all or a portion of the visual content as remote graphics to the computing device for the computing device to receive at 400.

The controller and/or the graphics application can then display the remote graphics at a region of the user interface and a sensor can detect a user repositioning the region at 410. The sensor can detect the user repositioning the region by detecting for a touch gesture, a visual gesture, and/or an audio gesture from the user. The gesture can be to reposition the region of the user interface by panning or zooming the user interface. If the region of the user interface is repositioned, the controller and/or the graphics application can identify which coordinates of the user interface correspond to the repositioned region and transmit the coordinates to the second computing device. The second computing device can then identify which locations of the visual content correspond to the coordinates and proceed to transfer the visual content located at the coordinates as remote graphics to the computing device. The controller and/or the graphics application can then display the remote graphics corresponding to the repositioned region on the display component at 420. The method is then complete. In other embodiments, the method of FIG. 4 includes additional steps in addition to and/or in lieu of those depicted in FIG. 4.

Figure 5:
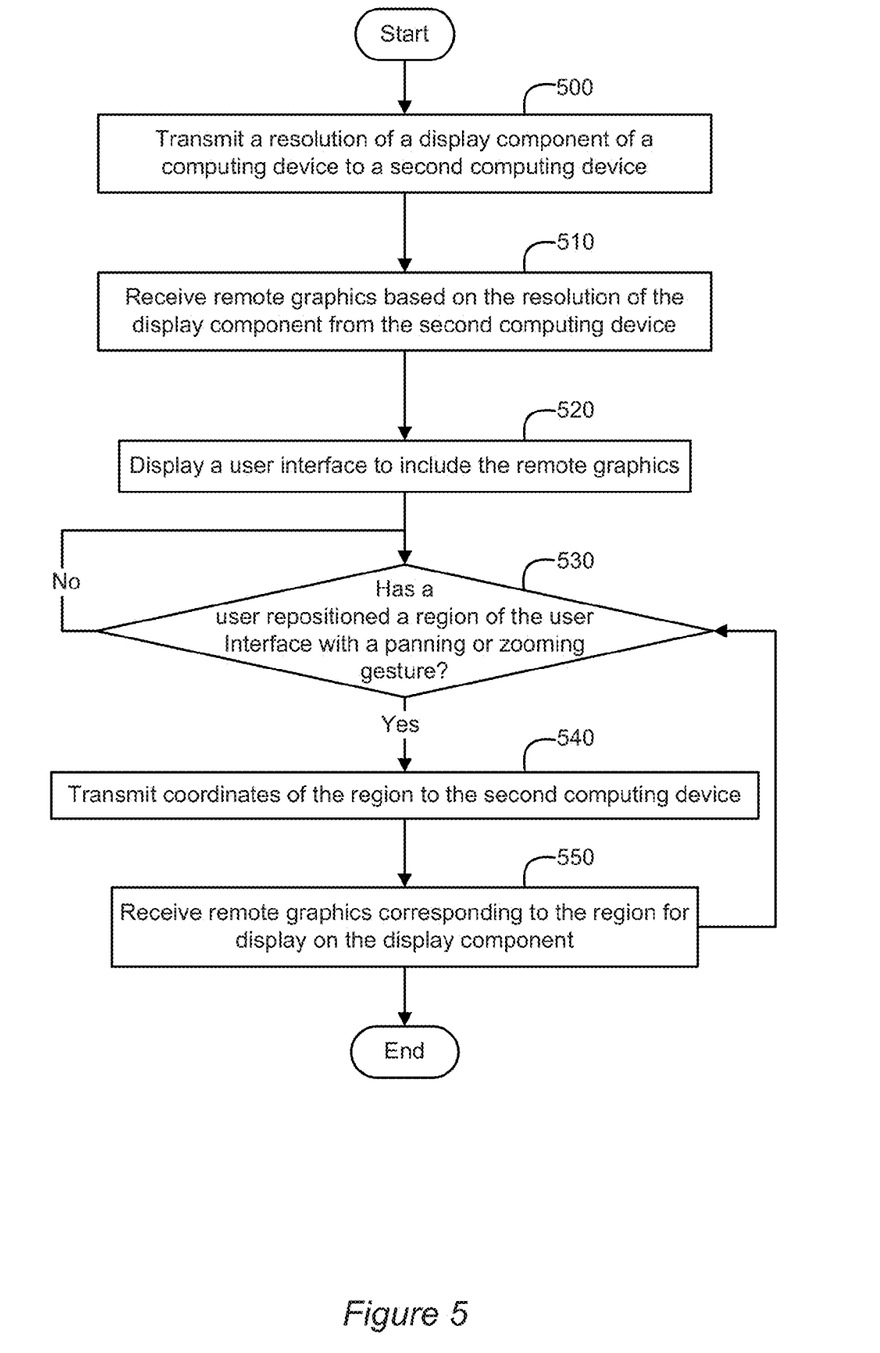
FIG. 5 is a flow chart illustrating a method for managing remote graphics according to another example.

FIG. 5 is a flow chart illustrating a method for managing remote graphics according to another example. The controller and/or the graphics application can initially transmit a resolution as a size of a display component to a second computing device at 500. The second computing device can determine whether to transfer all or a portion of visual content based on the resolution of the display component. The second computing device can then send remote graphics of all or a portion of the visual content for the computing device to receive at 510. The controller and/or the graphics application can then display the remote graphics at a region of the user interface. As noted above, the display component displays the region of user interface.

A sensor can then detect for a user repositioning the region of the user interface through a visual, touch, or audio gesture to navigate the user interface at 530. If the sensor does not detect any activity, the sensor continues to detect for the user repositioning the region at 530. If the sensor detects the user repositioning the region, the controller and/or the graphics application transmits information, such as coordinates, of the repositioned region to the second computing device at 540. In response to receiving the information, the second computing device can determine that the user would like to view a different area of the visual content and proceed to identify a portion of the visual content corresponding to the coordinates. The second computing device can then update the remote graphics to include the new portion of the visual content and proceed to transmit the remote graphics to the computing device. The controller and/or the graphics application can receive the remote graphics corresponding to the repositioned region and proceed to display the remote graphics at the region of the user interface on the display component at 550. The method is then complete. In other embodiments, the method of FIG. 5 includes additional steps in addition to and/or in lieu of those depicted in FIG. 5.

What is claimed is:

1. A computing device comprising:
 a display component to display a user interface with remote graphics;
 a communication component to receive from a second computing device the remote graphics, wherein the remote graphics include a selected portion of a remote desktop of the second computing device, wherein a size of the selected portion of the remote desktop is determined by the second computing device based on a size of the display component of the computing device;
 a sensor to detect a user repositioning a region of the user interface; and
 a controller to communicate information of the repositioned region to the second computing device and to receive updated remote graphics corresponding to the repositioned region from the second computing device.

2. The computing device of claim 1 wherein the size of the display component includes a resolution of the display component.

3. The computing device of claim 2 wherein the communication component is further to transmit the resolution of the display component to the second computing device.

4. The computing device of claim 3 wherein the second computing device is to determine the size of the selected portion using the resolution transmitted by the communication component of the computing device.

5. The computing device of claim 1 wherein the size of the display component includes horizontal and vertical distances between pixels of the display component.

6. The computing device of claim 1 wherein a size of the region corresponds to the size of the display component.

7. The computing device of claim 1 wherein a resolution of the selected portion matches a resolution of the display component.

8. The computing device of claim 1 wherein the user interface includes off screen content not included in the region and not displayed on the display component.

9. The computing device of claim 8 wherein the off screen content corresponds to a non-selected portion of the visual content included on the second computing device.

10. The computing device of claim 1 wherein the sensor is to detect a touch gesture on the user interface to reposition the region.

11. A method comprising:
 receiving, at a computing device, remote graphics from a second computing device, wherein the remote graphics correspond to a selected portion of visual content of the second computing device, wherein a size of the selected portion is determined by the second computing device based on a size of a display component of the computing device;
 displaying, on the display component, a user interface including the remote graphics;
 detecting a user repositioning a region of the user interface;
 transmitting information of the repositioned region to the second computing device; and
 receiving updated remote graphics corresponding to the repositioned region for display on the display component.

12. The method of claim 11 further comprising identifying a resolution of the display component and transmitting the resolution as the size of the display component to the second computing device.

13. The method of claim 11 wherein the visual content is a remote desktop of the second computing device.

14. The method of claim 13 wherein the updated remote graphics corresponding to the repositioned region include portions of the visual content previously not included in the remote graphics.

15. The method of claim 11 wherein detecting a user reposition the region includes detecting for a zoom command from the user.

16. The method of claim 15 wherein the remote graphics corresponding to the repositioned region includes visual content scaled according to the zoom command.

17. A non-transitory computer readable medium storing instructions that if executed cause a controller to:
 transmit a resolution of a display component of a computing device to a second computing device;
 receive remote graphics from the second computing device, wherein the remote graphics correspond to a selected portion of visual content of the second computing device, wherein a size of the selected portion is determined by the second computing device based on the resolution of the display component;

display, on the display component, a user interface including the remote graphics;

detect a user repositioning a region of the user interface;

transmit information of the repositioned region to the second computing device; and receive updated remote graphics corresponding to the repositioned region for display on the display component.

18. The non-transitory computer readable medium of claim 17 wherein the visual content is a remote desktop of the second computing device.

19. The non-transitory computer readable medium of claim 17 wherein the information of the repositioned region identifies coordinates of the user interface corresponding to the repositioned region.

20. The non-transitory computer readable medium of claim 17 wherein the remote graphics from the second computing device does not include visual content outside the region.

* * * * *